United States Patent
Hyneck et al.

(10) Patent No.: US 9,617,968 B2
(45) Date of Patent: Apr. 11, 2017

(54) HYDRAULIC MACHINE

(75) Inventors: Sebastian Hyneck, Heidenheim (DE); Gerhard Wengert, Haunsheim (DE)

(73) Assignee: Voith Patent GmbH, Heidenheim (DE)

(*) Notice: Subject to any disclaimer, the term of this patent is extended or adjusted under 35 U.S.C. 154(b) by 511 days.

(21) Appl. No.: 14/122,212

(22) PCT Filed: Jul. 26, 2012

(86) PCT No.: PCT/EP2012/003158
§ 371 (c)(1),
(2), (4) Date: Feb. 5, 2014

(87) PCT Pub. No.: WO2013/056757
PCT Pub. Date: Apr. 25, 2013

(65) Prior Publication Data
US 2014/0186186 A1  Jul. 3, 2014

(30) Foreign Application Priority Data
Oct. 19, 2011 (DE) .................. 10 2011 116 277

(51) Int. Cl.
*F03B 11/02* (2006.01)
*F03B 3/02* (2006.01)
(Continued)

(52) U.S. Cl.
CPC .............. *F03B 3/02* (2013.01); *F03B 11/02* (2013.01); *F03B 11/04* (2013.01); *F03B 3/186* (2013.01);
(Continued)

(58) Field of Classification Search
CPC ............. F03B 11/02; F03B 3/186; F03B 3/02
(Continued)

(56) References Cited

U.S. PATENT DOCUMENTS

| 4,135,853 A | 1/1979 | Jansson |
| 4,496,282 A | 1/1985 | Gokhman |

(Continued)

FOREIGN PATENT DOCUMENTS

| CN | 101548095 A | 9/2009 |
| CN | 201810461 U | 4/2011 |

(Continued)

OTHER PUBLICATIONS

PCT International Preliminary Report on Patentability dated May 1, 2014 in PCT Application No. PCT/EP2012/003158.

(Continued)

*Primary Examiner* — Christopher Besler
(74) *Attorney, Agent, or Firm* — Farjami & Farjami LLP (57) ABSTRACT

The invention relates to a hydraulic machine having an impeller wheel that comprises a plurality of impeller blades; having a spiral housing that encloses the impeller wheel and that is open toward said impeller wheel by a circumferential slit formed by two circumferential edges; having a traverse ring, comprising two traverse ring decks that are connected to one another by tension anchors; wherein the spiral housing is composed of segments that meet in the flow direction and that are welded to each other, the ends of which segments stand on the respective traverse ring deck and are welded to said deck; wherein at the meeting point between two segments that are adjacent to one another and one traverse ring deck a stiffening element is provided that protrudes into the inner space of the spiral housing; and wherein the extension of the stiffening element into the inner space of the spiral housing is so small that the flow is not affected in a significant manner.

2 Claims, 8 Drawing Sheets

(51) Int. Cl.
*F03B 11/04* (2006.01)
*F03B 3/18* (2006.01)

(52) U.S. Cl.
CPC ....... *F05B 2230/232* (2013.01); *Y02E 10/223* (2013.01); *Y02E 10/226* (2013.01); *Y02P 70/525* (2015.11)

(58) Field of Classification Search
USPC ............................ 415/212.1, 215.1, 214.1
See application file for complete search history.

(56) References Cited

U.S. PATENT DOCUMENTS

| | | | |
|---|---|---|---|
| 7,318,700 | B2 | 1/2008 | Sugg |
| 7,438,521 | B2 * | 10/2008 | Enomoto ................ F03B 3/186 415/161 |
| 2005/0169751 | A1 | 8/2005 | Sugg |

FOREIGN PATENT DOCUMENTS

| | | | | |
|---|---|---|---|---|
| CN | 201943869 U | 8/2011 | | |
| DE | 1 258 360 | 1/1968 | | |
| DE | 199 50 228 | 11/2000 | | |
| DE | 10 2006 050 203 | 4/2008 | | |
| DE | WO 2008049479 A1 * | 5/2008 | ............. | F03B 3/186 |
| EP | 1 504 190 | 2/2005 | | |
| WO | WO 03/098032 | 11/2003 | | |

OTHER PUBLICATIONS

International Search Report in PCT Application No. PCT/EP03/04619 dated Nov. 13, 2003.

\* cited by examiner

Fig. 9

HYDRAULIC MACHINE

This is a U.S. national phase application, which is based on, and claims priority from, PCT application Serial No. PCT/EP2012/003158, filed Jul. 26, 2012, which claims priority from foreign application Serial No. 10 2011 116 277.5, filed Oct. 19, 2011, in Germany.

The invention relates to a hydraulic machine, especially a water turbine, pump turbine or pump, according to the preamble of claim 1. It may concern machines of the Francis or Kaplan type, or other machines. It is relevant that it concerns machines with a spiral housing.

Reference is hereby made as an example to U.S. Pat. No. 4,496,282 or DE 199 50 228 A1.

The spiral housing of such a machine encloses the blade wheel. It lies in a plane perpendicular to the rotational axis of the blade wheel. Since the blade wheel axis extends substantially perpendicularly, it therefore concerns a horizontal plane. The spiral housing is composed of segments. They abut one another in the direction of flow and are welded together.

The spiral housing is open on its inside towards the blade wheel. It therefore comprises a slit which extends around the inner circumference of the spiral housing, so that the medium from the spiral housing can flow through the slit on the entire inner circumference towards the blade wheel. The slit is therefore designed by two circumferential edges.

A traverse ring is adjacent to said slit in the direction of flow. It comprises two traverse ring decks which are concentrically arranged to the rotational axis of the blade wheel and have a mutual distance from one another in the axial direction. The decks are connected to each other by tie rods, the so-called traverses. Furthermore, each of the aforementioned circumferential edges of the spiral housing is fixedly connected to one of the two traverse ring decks.

The traverse ring is used among other things to prevent widening of the spiral housing under the high internal pressure. The tie rods guide the flow from the spiral housing into the middle of the machine.

Forces thus act on said tie rods, as also on the connecting point between the respective traverse ring deck and the associated circumferential edge of the spiral housing. The connection must be arranged in a completely reliable way and must be able to withstand high forces. It needs to be considered that pressure fluctuations or pressure oscillations can occur in spiral housing.

Considerable efforts have been undertaken to arrange the connection in a durable and reliable way, in combination with the lowest possible material input. Generally, it concerns a welded connection between the respective circumferential edge of spiral housing and the associated traverse ring deck. The production of this connection has proven to be difficult.

Furthermore, the strength of the spiral housing itself is problematic. The spiral housing is subject to high water pressure during operation. The water pressure leads to a deformation of the segment plates and high tensions. The deformation is disadvantageous for the efficiency of the turbine. The high water pressures also lead to a high tension concentration. This can lead to damage. Such tension concentrations especially occur at the transitional point between two mutually adjacent segments and a deck of the traverse ring.

In order to remedy this problem it was proposed in WO 03/098032 A1 to provide a reinforcing plate in the region of the transition between two mutually adjacent segments to the deck of the traverse ring, namely on the outside of segments. This solution also did not lead to satisfactory results.

The invention is therefore based on the object of providing a hydraulic machine according to the preamble of claim 1 in such a way that the tensions occurring in the aforementioned region between two mutually adjacent segments and the associated deck are managed reliably without leading to excessive loads and deformations.

This object is achieved by the features of claim 1.

The inventors have chosen a path that differs from the one in the mentioned WO specification. Instead of providing stiffening on the outside surface of the segment, they have provided a stiffening element on the inside. The stiffening element is extremely small. It extends to an only very low extent into the interior space of the spiral housing, so that the flow is not impaired significantly. It is best produced in such a way that the mutually adjacent corners of the ends of two adjacent segments are bent inwardly and joined into a roof-like projection, e.g. by welding. This could also be referred to as a "retracted corner". As a result, the projection extends for example in a practical case by only a fraction of the radial extension of the traverse ring decks into the interior space of the spiral housing. The extension in the direction of the abutment of the mutually adjacent segments is similarly low.

The tension at the transition points is reduced considerably by the invention, especially the tension peaks. The operational lifespan of the spiral housing is increased.

Instead of forming the projection of the corners of the ends of mutually adjacent spirals it is also possible to use separately produced stiffening elements which again could be provided with the shape of a roof for example.

The surprising aspect in the invention is that the stiffening elements, although they protrude inwardly, have a higher strength effect than those of the state of the art. A great success is thus achieved with little effort. The flow in the spiral housing is not impaired in any way.

In addition to the idea of the inwardly protruding stiffening element, it is useful to form the individual segment of circular arcs of different diameters.

The state of the art and the invention are explained in closer detail by reference to the enclosed drawings, which show the following in detail.

Figure 1:
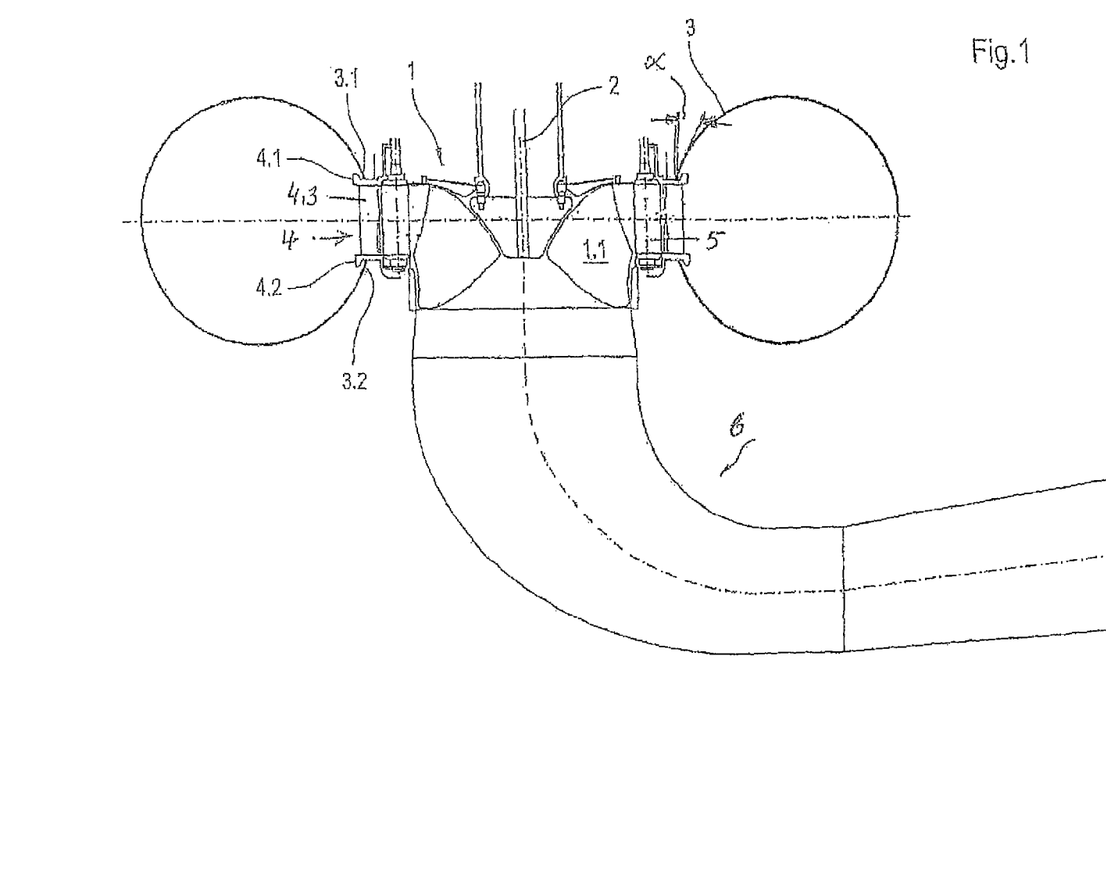
FIG. 1 shows the relevant components of a conventional Francis turbine in a meridian sectional view.

The Francis turbine shown in FIG. 1 comprises a blade wheel 1. It comprises a plurality of blades 1.1. The blade wheel 1 revolves about a rotational axis 2.

The blade wheel 1 is enclosed by a spiral housing 3. The spiral housing 3 has a circular cross-section for example. It comprises a circumferential slit-like opening towards the blade wheel 1. The opening slit is bounded by circumferential edges 3.1, 3.2.

A traverse ring 4 follows the circumferential slit formed by the edges 3.1, 3.2. Said traverse ring comprises two traverse ring decks 4.1 and 4.2. A traverse 4.3 is respectively used as a tie rod.

The regions of the circumferential edges 3.1, 3.2 of the spiral housing are welded together with the traverse ring deck 4.1, 4.2.

A guide apparatus with guide blades 5 is provided between the traverse ring and the blade wheel.

A draft tube 6 which comprises several sections is connected to the blade wheel 1 in the direction of flow.

The illustration shows that the spiral housing has a circular cross-section. The regions of the circumferential edges are inclined against the vertical at the connection points to the two traverse ring decks 4.1, 4.2. This means that the edge regions of the spiral housing do not extend parallel to the rotational axis 2 of the blade wheel 1 (see angle ☐ in FIG. 1). It is approximately 15 to 40°.

Figure 2:
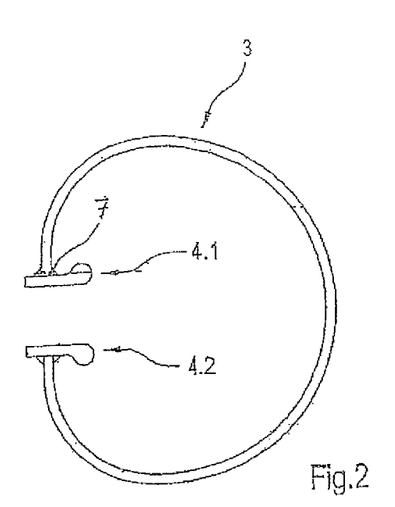
FIG. 2 shows a meridian sectional view of a spiral housing with the two traverse ring decks of a traverse ring according to a first embodiment of the invention.
Figure 3:
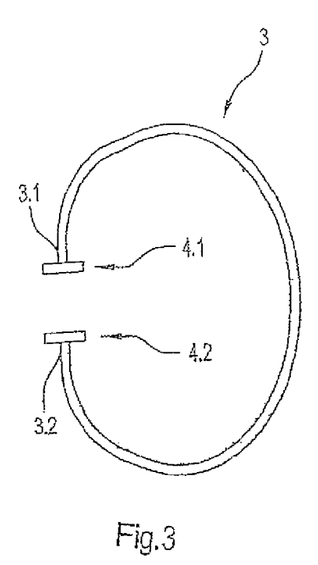
FIG. 3 shows a meridian sectional view of a spiral housing with the two traverse ring decks of a traverse ring according to a second embodiment of the invention.

FIGS. 2 and 3 illustrate two different embodiments of the invention. In all other respects, the associated hydraulic machines can be arranged like the machine shown in FIG. 1.

The two embodiments according to FIGS. 2 and 3 have in common that the spiral housing stands nearly perpendicularly to the connecting areas of the associated traverse ring decks 4.1, 4.2 in the region of the circumferential edges 3.1, 3.2.

This is achieved in the embodiment according to FIG. 2 in such a way that the edge regions of the spiral housing 3 are deformed over the circular form. They extend virtually parallel to the rotational axis 2 according to FIG. 1. Fixing is produced by means welded seams 7.

In the second embodiment according to FIG. 3, the traverse rings 4.1, 4.2 are again formed and arranged conventionally. The edge regions 3.1, 3.2 again stand perpendicularly to the traverse ring deck 4.1, 4.2 and accordingly extend parallel to the rotational axis 2 of the blade wheel 1. The remaining cross-section of the spiral housing 3 is approximately elliptical.

Figure 4:
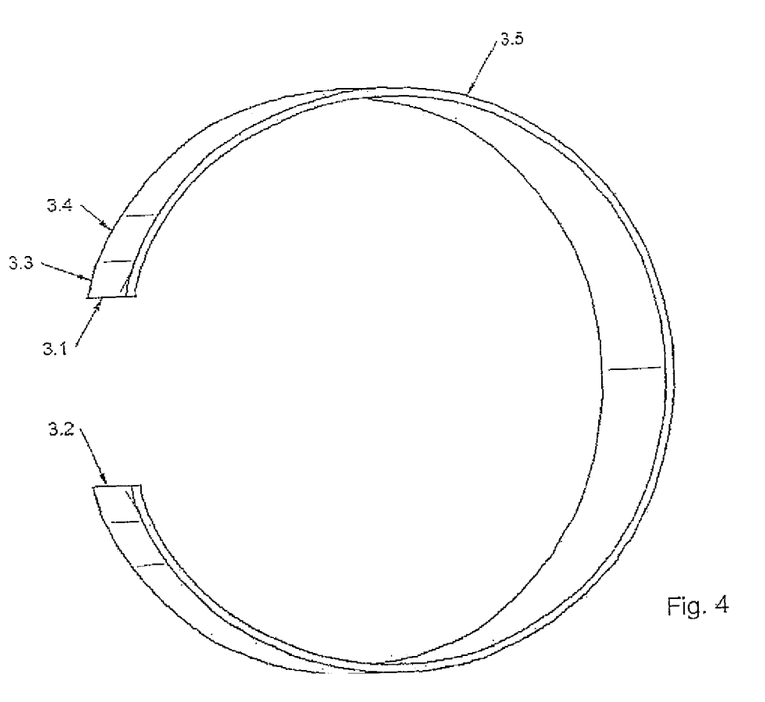
FIG. 4 shows a segment in accordance with the invention in a perspective view.

The circular segment shown in FIG. 4 is composed of circular arcs of different diameters. The illustration shows the two circumferential edges 3.1, 3.2. This is followed by a straight connecting strip 3.3, followed by a first circular arc 3.4 of the smaller diameter and a second circular arc 3.5 of larger diameter.

The same forms are shown in FIG. 5 again.

Figure 5:
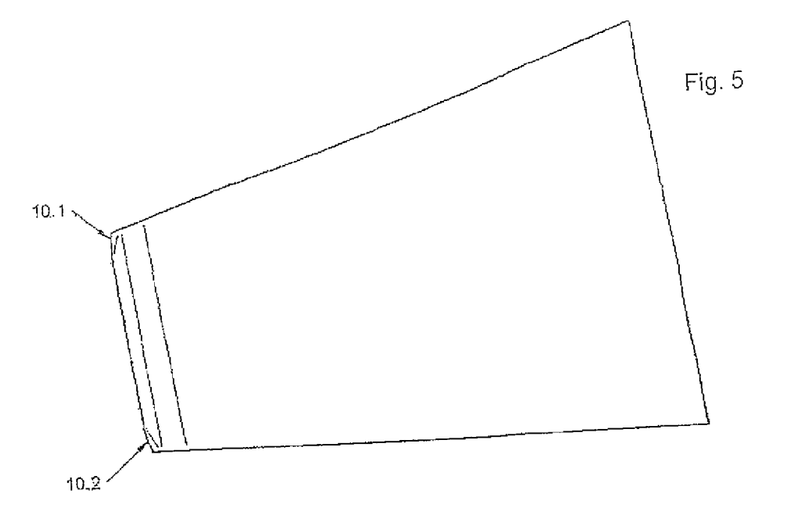
FIG. 5 shows the segment according to FIG. 4 in a top view.

The relevant feature of the invention are the two stiffening corners (retracted corners) 10.1, 10.2, which will be discussed below in closer detail.

Figure 6:
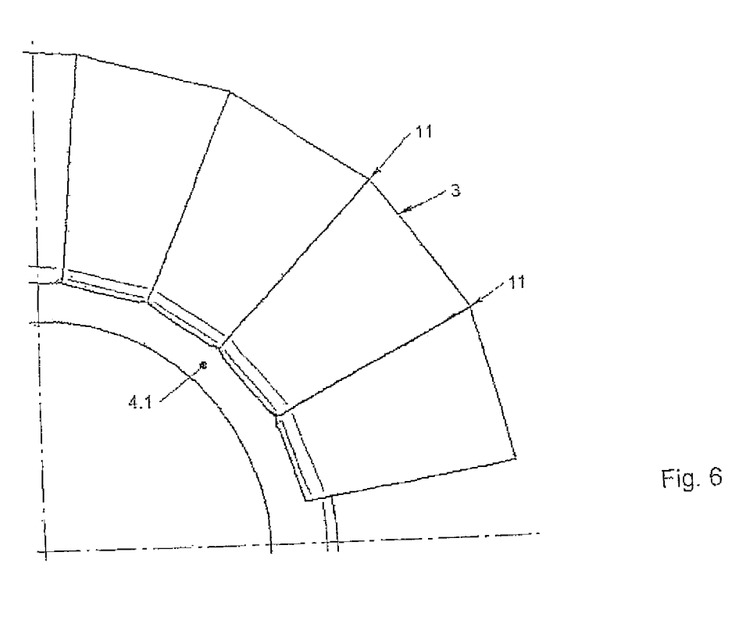
FIG. 6 shows a number of segments which are joined.

FIG. 6 shows several segments which abut one another, i.e. the joints 11 which are welded together. The segments rest on a traverse ring deck 4.1, with which they are also welded together. Stiffening elements 10 are disposed on the radially inner end of each joint 11 and simultaneously on the traverse ring deck 4.1, e.g. formed by stiffening corners 10.1, 10.2 according to FIG. 5.

Figure 7:
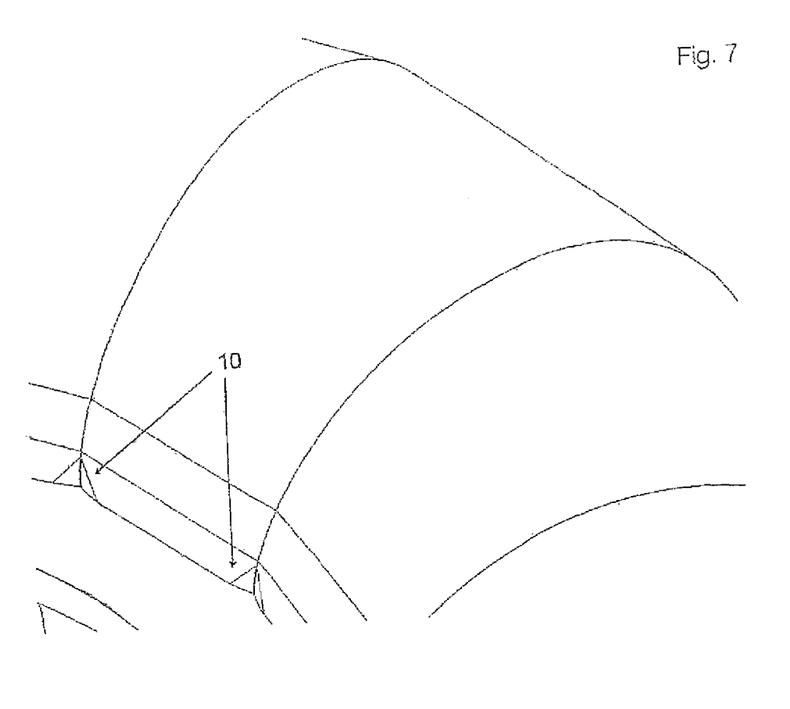
FIG. 7 shows a view of a spiral housing in accordance with the invention from the outside.
Figure 8:
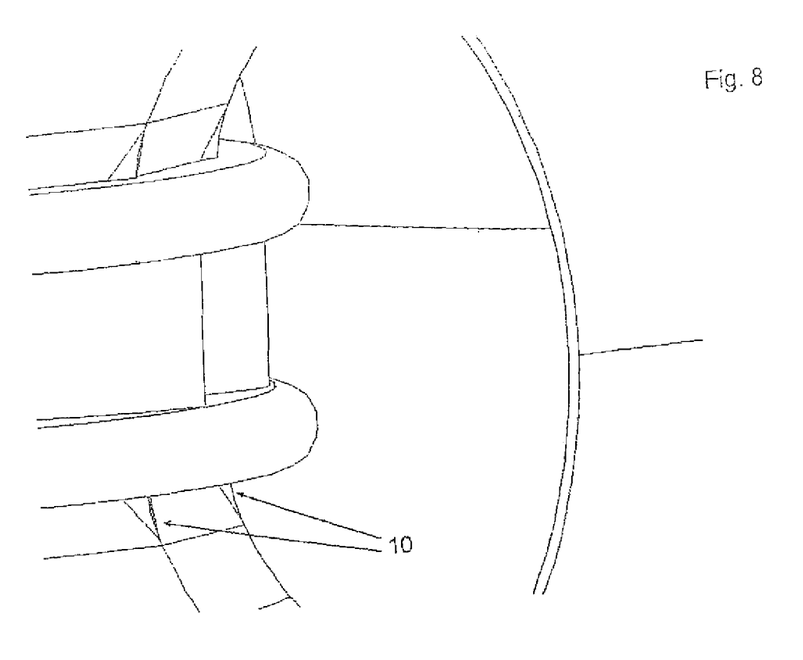
FIG. 8 shows a view of the spiral housing according to FIG. 7 from the inside.
Figure 9:
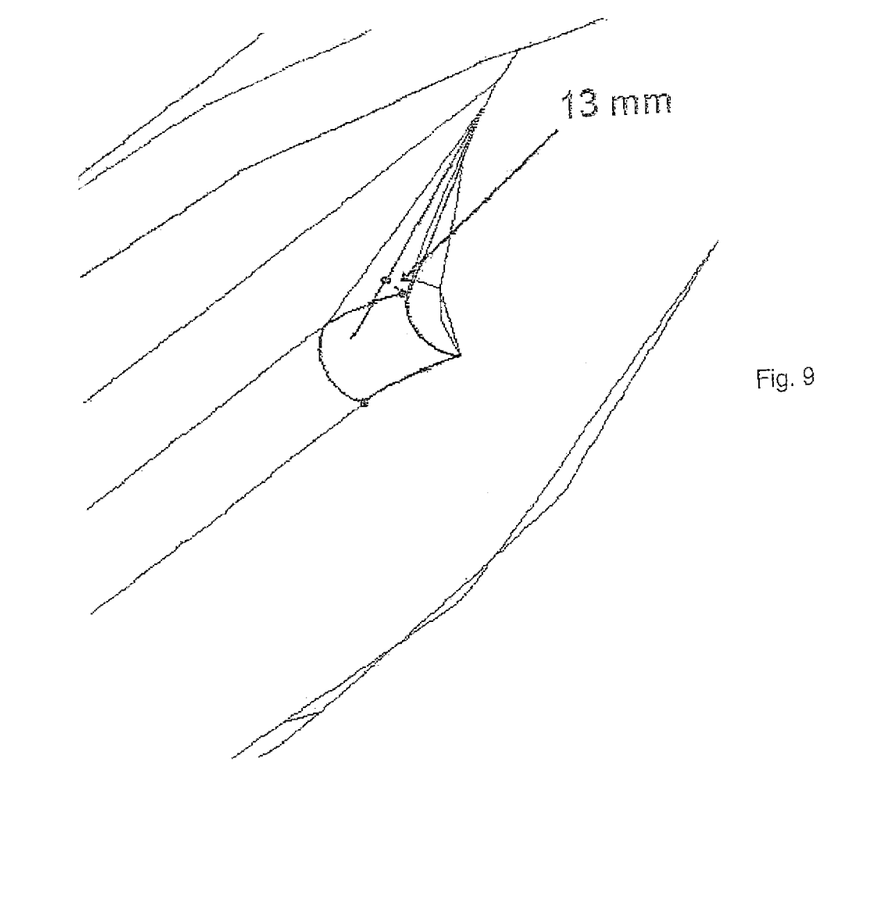
FIG. 9 shows a 3D view of a spiral housing from the inside, namely on a stiffening corner.

The stiffening corners are shown in closer detail in FIGS. 7, 8 and 9.

Tension peaks are clearly reduced by the invention at the transition points, especially at the abutment points and especially where the abutment points meet the respective transverse ring deck. This increases the operational lifespan of the spiral housing. Alternatively, thinner sheets can be used for the segments of the spiral housing, thus reducing the weight and the production costs.

The stiffening corners or retracted corners in accordance with the invention are arranged similar to a dog-ear in a book. They are formed by bending the radially inner corners of the spiral segments. They distribute and reduce the bending stress in a broader area around the transition point.

As already mentioned above, the stiffening corners are bent into the interior space of the spiral housing and therefore protrude into the flow. The astounding aspect is that the influences on the hydraulics are uncritical. The protrusion is only a few millimeters, in the concrete case 2 to 20 mm, e.g. 10 to 15 mm or 5 to 10 mm. The protrusion can generally be 0.5 to 1.0% of the diameter of the spiral at the respective location.

Although the production of a stiffening corner by bending segment corners means a further step in the production of the spiral housing, its considerable advantage is that additional welding is not necessary.

The load at the highly loaded transition points in a spiral housing in accordance with the invention has shown that it is only 0.5 to 0.7 of the load of a classic spiral housing.

The configuration of the individual segment of sections of different radii has also proven to be advantageous for reducing the load.

LIST OF REFERENCE NUMERALS

1 Blade wheel
1.1 Blades
2 Rotational axis
3 Spiral housing
3.1 Circumferential edge of the spiral housing
3.2 Circumferential edge of the spiral housing
3.3 Straight connecting piece
3.4 First circular arc of smaller diameter
3.5 Second circular arc of larger diameter
4 Traverse ring
4.1 Traverse ring deck
4.2 Traverse ring deck
4.3 Traverse
5 Guide blade
6 Draft tube
7 Welded seams
10 Stiffening element
10.1 Stiffening corners
10.2 Stiffening corners
11 Joints

The invention claimed is:
1. A hydraulic machine comprising:
   a blade wheel including a plurality of blades;
   a spiral housing enclosing the blade wheel and being open towards the blade wheel by a circumferential slit formed by two circumferential edges;
   a traverse ring having two traverse ring decks connected to each other by tie rods, wherein the spiral housing is made of segments which abut one another and are welded together, ends of the segments standing on a respective one of the two traverse ring decks and are welded to said deck;
   a stiffening element protruding into the spiral housing is provided at an abutment point between two of the segments that are adjacent to one another and the respective one of the two traverse ring decks;
   wherein the stiffening element protrudes into the spiral housing without influencing a flow of a medium in the spiral housing, and wherein the stiffening element is formed as a retracted corner.

2. The hydraulic machine according to claim 1, wherein the retracted corner is formed by flanging radially inner corner regions of each of the segments.

* * * * *